United States Patent [19]

James

[11] 3,749,258
[45] July 31, 1973

[54] THERMALLY REMOVABLE SUPPORT MEANS FOR LOADING LONG VERTICAL VESSELS

[75] Inventor: Maurice L. James, Pinole, Calif.
[73] Assignee: Calcatco, Inc., Richmond, Calif.
[22] Filed: Feb. 9, 1972
[21] Appl. No.: 224,899

[52] U.S. Cl. .................. 214/17 C, 53/260
[51] Int. Cl. ............................. B65g 65/30
[58] Field of Search .............. 214/17 C; 53/260, 53/29; 222/392; 141/392

[56] References Cited
UNITED STATES PATENTS
797,751   8/1905   Roth .................................. 53/260
3,562,998   2/1971   Edwards ............................ 53/29

Primary Examiner—Evon C. Blunk
Assistant Examiner—H. S. Lane
Attorney—Stephen S. Townsend et al.

[57] ABSTRACT

Method for loading long vertical columns or vessels with friable particulate matter employing a solid mass of material, substantially conforming to the inner shape of the column, wherein the material is normally a fluid at ambient or mildly elevated temperatures. The mass is supported by a line, such as a cable.

The mass is introduced into the upper end of the column, and lowered slowly as the friable particulate matter is introduced into the column until the column is filled, and the mass has descended to the bottom of the column. The mass then melts or evaporates, leaving a filled column substantially free of broken particulate matter as a result of impact from a long fall in the column.

13 Claims, 2 Drawing Figures

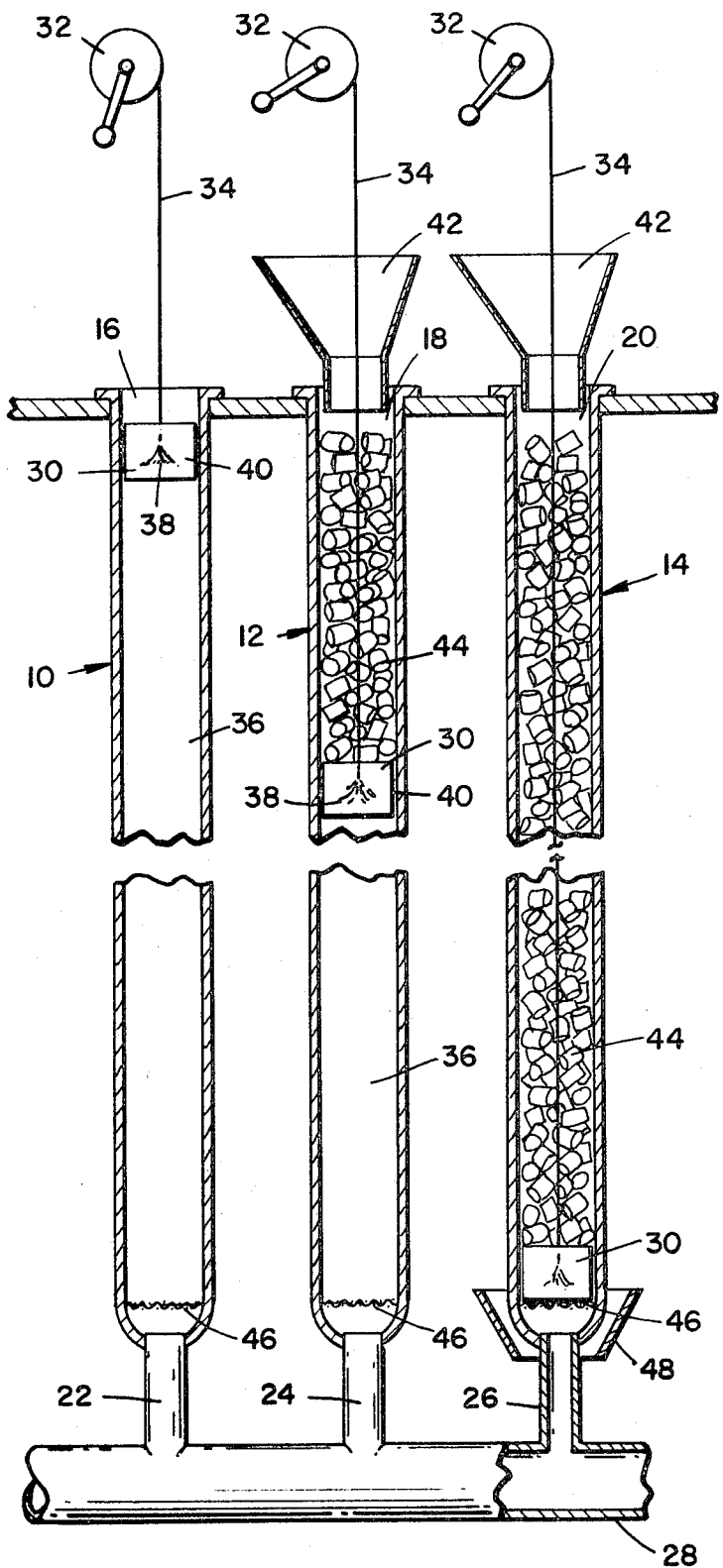
FIG_1
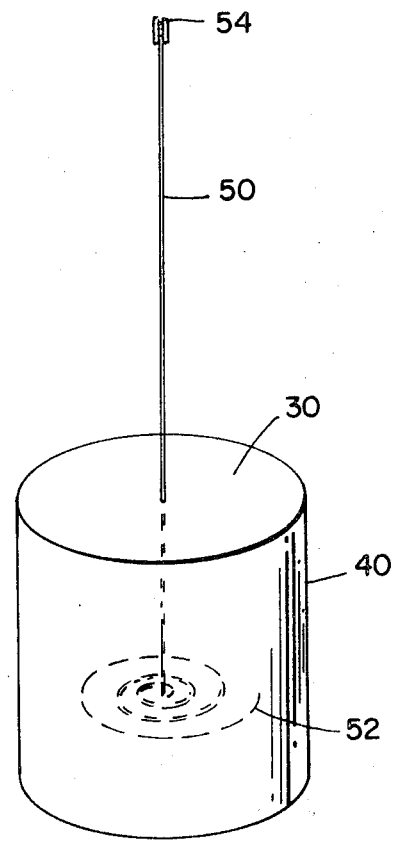
FIG_2

THERMALLY REMOVABLE SUPPORT MEANS FOR LOADING LONG VERTICAL VESSELS

BACKGROUND OF THE INVENTION

1. Field of the Invention

In much chemical processing, long vertical columns are employed which are packed with particulate matter. The particulate matter may serve as catalyst, heat transfer agent, separating means or for other purposes. For most of these applications, a high surface area to volume is required, so that the individual particles are porous. These porous particles are ususlly brittle and friable.

When loading a long vertical column, unless precautions are taken, the free fall of the particle from the top of the column will result in substantial fragmentation of the particles with formation of dust. The breaking of the particles has two serious effects. First, there is substantial loss of useful catalyst particles. Secondly, the dust acts to block the passages between the particles, so as to reduce the rate of flow through the column. Therefore, the efficiency of a column is greatly reduced and the catalyst life is frequently shortened.

2. Description of the Prior Art

U.S. Pat. No. 3,562,998 discloses employing a sealed tube for packing catalyst, where the end is folded on itself and sealed with adhesive tape, the tube lowered into the column, and the adhesive removed by pulling on the adhesive with a cable. The tube is than raised slowly, releasing the catalyst in the column.

SUMMARY OF THE INVENTION

Means is provided for loading a long vertical vessel of substantially constant cross section from its upper end with particulate matter, without subjecting the particulate matter to a free fall. A plug of solid material normally fluid at ambient or mildly elevated temperatures and supported by a line is introduced into the upper end of the column. The plug is slowly lowered as particulate matter is added, maintaining the level of catalyst relatively constant. When the plug reaches the bottom of the vessel or area to be loaded, where there is normally a grid, or other supporting means, the plug is allowed to melt or evaporate and the cable withdrawn through the catalyst.

BRIEF DESCRIPTION OF THE DRAWINGS

FIG. 1 is an elevation, partly broken away, showing the different stages of filling a vertical process vessel with particulate material; and FIG. 2 is a detailed perspective view of a plug with the cable embedded in the plug in an alternate embodiment.

DESCRIPTION OF THE SPECIFIC EMBODIMENTS

Large vertical vessels, having a zone of substantially constant cross section, usually tubes or columns, are packed with particulate matter, whereby free fall of the particulate matter is substantially avoided. A plug is employed of sufficient depth to provide the desired support throughout the loading operation.

The conformation of the plug side walls or surface will substantially conform to the inner walls of the vessel; the plug is of slightly smaller cross section than the cross section of the vessel. Embedded in the plug is a section of one or more cables which extend from the plug to a means for paying out or taking up the cables.

The plug is comprised of a material which is normally fluid at ambient or mildly elevated temperature, e.g., $\leq 50°$ C.

In loading the vessel, the aforedescribed plug is introduced into the top of the column and catalyst loaded onto the top of the plug, usually by means of a hopper. As the plug is slowly lowered, particulate matter is continuously added, so as to maintain a substantially constant level of particulate matter. When the plug encounters the bottom of the column or, usually, a supporting means for the particulate matter, addition of the particulate matter is terminated and the plug allowed to melt or evaporate.

The liquid, if any, formed from melting of the plug is then removed by any convenient means. Any gas will evaporate out of the vessel.

The plug can be made of any material which is removable by the heat available under ambient conditions or by relatively mild external heat. Therefore, any material which can be solidified at a temperature below ambient, normally about $15° - 25°$ C, and when solidified has sufficient strength to provide support for a column of material, may be employed. The choice of material will normally depend upon interaction with the particulate matter. In some instances, an inert cover for the plug may be employed, which under the conditions of use for the particulate matter will be transformed into an inert non-interfering material.

Various materials which may be used for the plug include water, hydrocarbons, alcohols, or other liquids which can be solidified below room temperature. Materials can also be employed which are gases at room temperature, particularly materials which sublimate, such as carbon dioxide.

In preparing the supporting plug, one end of the line or a line connector is maintained in a refrigeration unit in which the plug is to be formed. The portion of the line or line connector which is to be embedded in the plug should provide for a firm, strong link between the line portion and the material employed for the plug. When the plug has disintegrated, the portion of the line or line connector within the plug should be of relatively small cross section, as it is drawn up through the catalyst.

To enhance the mechanical connection between the line or line connector and the plug material, without increasing the effective cross section, various structures may be employed. The end of a cable line may be splayed. A loop of flexible line may be employed or a concentric winding of flexible line, or a plurality of arms which are hingedly connected to a center, so as to retract to form a column of a narrow radius.

The particular mechanical connection between the line and the plug is not critical to this invention, as long as the mechanical connection provides the necessary bond or coupling during use and can be withdrawn, once the plug has disintegrated. The particular method of introducing the connecting means into the plug may be varied widely, for example, (1) by dipping the end of the line into the liquid during formation of the plug, or (2) forming half of the plug, placing a cable line in the desired configuration on the surface of the formed half of the plug and then forming the remainder of the plug. Other methods will also come to mind.

One or more lines may be employed for lowering the plug, depending on the size of the line, the weight of the material introduced, the geometry of the plug and vessel, and the like. The materials employed for a flexible line, such as a cable, may be varied widely, depending on the strength required and the nature of the particulate matter. Steel cable, hemp, plastic cable, e.g., nylon and polypropylene, etc. may be employed. Instead of a flexible line, a rigid line can be employed, such as a rod or pipe.

Where resistance is encountered in removing the line, after the plug has been fluidified, various expedients can be employed. A cable can be lowered in a telescoping housing, so that only a portion of the line is moving against the resistance of the particulate matter. Alternatively, a plurality of lines can be employed which are in close juxtaposition to each other and provision made for raising each line independently. Various coatings or lubricants can be used, such as teflon, light hydrocarbons, etc.

The size of the plug will be governed as to its horizontal cross section by the shape of the vessel. With tubular vessels, the plug will be cylindrical. For the purposes of this invention, the particulate matter will be introduced into an area or zone of substantially constant cross section. Therefore, the plug will have a cross section almost equal to or slightly smaller than the cross section of the area or zone of the vessel, so as to slide smoothly through the vessel. The distance from the plug to the inner wall of the vessel will be less than the average diameter of the particulate material, normally be less than 1 inch, and usually less than one-half inch.

Depending upon the material employed for the plug, the material may serve to lubricate the movement of the plug through the vessel. In this event, the plug may contact the inner wall of the vessel.

The height of the plug will depend upon the mechanical support required for the weight of the particulate matter to be introduced, the time for carrying out the operation, and the rate of disintegration of the plug under the normal conditions of operation. Normally, the plug will be at least one foot in height, and usually not exceed about three feet in height. As already indicated, the particular height of the plug will be primarily determined by the nature of the loading operation.

For further understanding of the subject invention, the drawings will now be considered. In FIG. 1, a series or reactor vessels 10, 12 and 14 are depicted. The vertical cylindrical vessels 10, 12 and 14 have top inlet openings 16, 18 and 20, respectively, for particulate matter or feed and bottom outlets 22, 24 and 26 respectively, communicating with a common header 28.

The first vessel 10 is depicted at a time prior to loading with particulate matter. For the purposes of this discussion, the particulate matter will be referred to as catalyst, and the plug or supporting platform will be referred to as made of ice. However, as already indicated, numerous variations are possible as to the nature of the particulate matter and the plug.

The plug 30 is lowered a short distance by means of reel 32 and line 34 through opening 16 into the interior 36 of the vessel 10. The end 38 of line 34 is splayed, so as to enhance the mechanical coupling between the line 34 and the plug 30. The shape of the plug is substantially cylindrical so as to fit relatively snugly into the interior 36 of the vessel. The plug has a slightly smaller cross section than the interior 36 of the vessel 10, so as to be able to descend freely. In addition, the water which forms at the sides 40 of the plug, can act as a lubricant to aid in the smooth descent of the plug 30.

A hopper 42 is erected about line 34 and catalyst 44 is slowly introduced by means of hopper 42. As the plug 30 descends, catalyst is continuously added so as to substantially maintain the same level of catalyst. The dimensions of the plug are such, that catalyst cannot slip by the sides of the plug to fall and be crushed at the bottom of the column.

The addition of catalyst 44 is continued, until as is evidenced in column 14, the column is filled with catalyst and the plug 30 encounters the grid 46 which inhibits further movement.

In order to accelerate the time in which the column is usable, a strip heater 48 is fitted about the column 14, to accelerate the rate of melting of the plug 30. When the plug 30 has been completely melted, the water can be withdrawn through header 28 and line 34 retreived by means of reel 32. The hopper 42 is removed from the opening 20. The column is now ready to be used for its intended purpose.

In FIG. 2, a second embodiment of the plug is depicted which shows a small line 50 having one end 52 coiled in serpentine fashion to enhance the mechanical coupling between the line and the plug. The other end 54 of the line has a coupler 56 so that the plug can be connected to line 34 for lowering into a column.

This invention can be used with a wide variety of vertical vessels having a substantially long uniform cross section. The plugs can be shaped in any convenient form or size by appropriate shaping of the refrigeration or sculpturing of the plug obtained from the refrigeration. The plug is particularly useful with vessels having relatively small inside diameters, that is diameters of from about 1.5 inches to about 5.5 inches. However, the plug may be used with any size vessel, subject to the limitations that the material used for the plug can provide sufficient mechanical support for the particulate matter and that a strong stable mechanical connection can be provided between the plug and the lowering line. The subject method permits the complete filling of a vessel, without having to repeat a number of filling cycles as required by the prior art.

Various types of particulate matter may be used in conjunction with the plug, such as catalyst, microsieves, ceramic rings, fragile packing materials, etc. The plug can be made from a variety of materials, so as to be compatible with the particulate matter. In many instances, a thin destructable protective cover may be used between the plug and the particulate matter.

The filling of a vessel can be carried out quickly and expeditiously in accordance with the subject invention. The equipment is simple, easily handled and allows for a single operation in filling a vessel. Particulate matter can be simultaneously weighted and loaded into a reactor without fear of significant dust formation from impact of the particle as a result of free fall.

Although the foregoing invention has been described in some detail by way of illustration and example for purposes of clarity of understanding, it will be obvious that certain changes and modifications may be practiced within the scope of the invention, as limited only by the scope of the appended claims.

What is claimed is:

1. Method of loading a zone of substantially constant cross section in a vessel with particulate matter, while preventing substantial free fall of said particulate matter, whic comprises:

introducing into a top end of said vessel a plug of a material normally fluid at ambient or mildly elevated temperatures having a portion of a line embedded in said plug;

adding particulate matter into said vessel while lowering said plug through said zone, by means of said line, preventing any substantial free fall of said particulate matter; and upon said plug reaching the bottom of said zone, fluidifying said plug and withdrawing said line.

2. A method according to claim 1 wherein said particulate matter is a friable porous material.

3. A method according to claim 1 wherein said plug is of water.

4. A method according to claim 1 wherein said plug is of carbon dioxide.

5. A method according to claim 1 wherein said plug has a cross section substantially conforming to the cross section of said zone.

6. A method according to claim 1 wherein said fluidifying is accelerated by external heat.

7. Method of loading a substantially tubular column with particulate matter, while preventing substantial free fall of said particulate matter which comprises;

introducing into the top of said column a cylindrical block of ice having the end of a line embedded in said ice;

lowering said block of ice by means of said line, while adding particulate matter into said column, so as to maintain a substantially constant level of particulate matter; and upon said block of ice reaching the bottom of said column, liquefying said block of ice and withdrawing said line.

8. Method according to claim 7 including heating said block of ice to accelerate the liquefaction.

9. Method according to claim 7, wherein the end of said line embedded in said block of ice is splayed.

10. Method according to claim 7, wherein the end of said line is coiled within said block of ice.

11. Method according to claim 7, wherein said line is rigid.

12. Method according to claim 11, wherein at least a portion of said line is telescopic, having the larger diameter near the top of said line.

13. Method of loading a zone of substantially constant cross section with particulate matter while preventing substantial free fall of said particulate matter which comprises:

introducing a plug supported by a cable at the upper end of said zone, wherein said plug consists essentially of a material fluidifiable at moderate temperatures;

adding a particulate matter into the upper end of said zone while lowering said plug by means of said cable, until said plug reaches the lower end of said zone; and fluidifying said plug and withdrawing said cable.

* * * * *